UNITED STATES PATENT OFFICE.

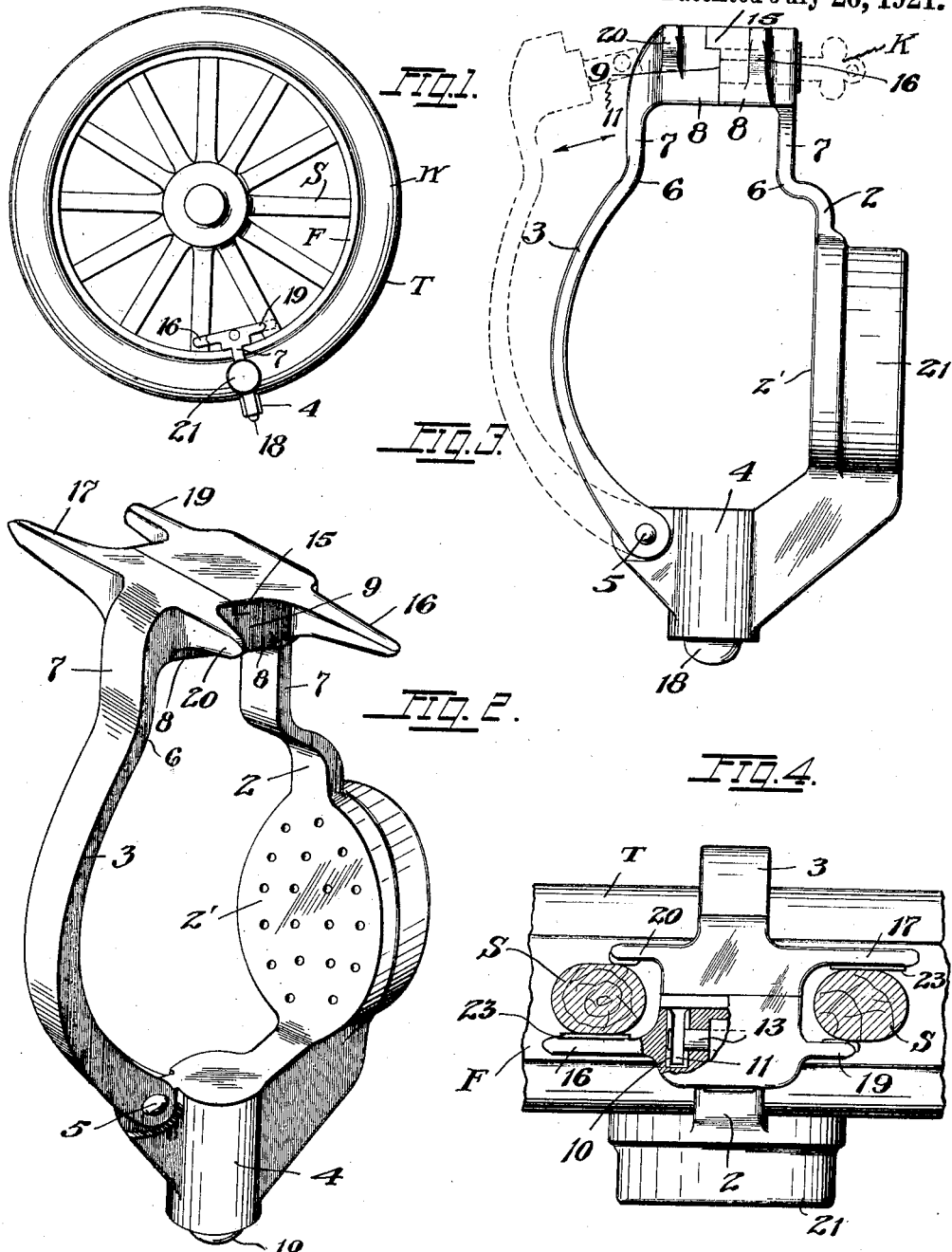

JOHN K. McDONALD, OF LOS ANGELES, CALIFORNIA, ASSIGNOR TO THEFT WARNING AUTO LOCK CORPORATION, OF LOS ANGELES, CALIFORNIA, A CORPORATION OF CALIFORNIA.

THEFT-WARNING AUTOMOBILE-LOCK.

1,385,461. Specification of Letters Patent. Patented July 26, 1921.

Application filed June 21, 1920. Serial No. 390,361.

*To all whom it may concern:*

Be it known that I, JOHN K. McDONALD, of Los Angeles, county of Los Angeles, and State of California, and a citizen of the United States, have invented a new and useful Theft-Warning Automobile-Lock, of which the following is a specification.

This invention relates to theft signals and particularly to a signal device applicable to the felly and tire of an automobile wheel.

It is one of the objects of the present invention to provide a theft warning signal or lock device adapted to be applied to a portion of the felly and tire of automobile wheels at a position between the spokes of the wheel on which it may be locked against surreptitious removal and so that in the event of the movement of the vehicle without the removal of the alarm or signal device attention will be called to the apparent unauthorized movement of the vehicle.

A further object of the invention is to provide for the prevention of the rotation of the device circumferentially and transversely around the tire and felly of the wheel to bring it to such a position as to render it substantially ineffective in its primary purpose.

It is a further object of the invention to provide means for preventing the rotation of the device around the tire which means will become disposed in overlapping relation to adjacent spokes of the wheel in the act of applying the device to the tire and felly and further to provide means that are substantial and durable, preferably rigidly connected to respective parts of the device so as to avoid any requirement or act of adjusting the limiting means other than by the mere application of the device to a tire and felly. In this connection it is a further object of the invention to provide for the protection of the finished surface of the spokes so that they will not be marred and thus destroy the usual surface finish.

It is also not only an object of the invention to prevent the circumferential movement of the device about the tire and felly to render it ineffective but it is also an object of the invention to prevent the warping or diagonal or oblique shifting of the device to such a position as will tend to reduce its efficiency.

It is a further object of the invention to provide an auto theft signal of extremely simple and yet ornate construction and of great ease of application to the wheel.

It is a further object of the invention to provide means for the prevention of the prying apart of the separable arms of the device after they have been locked in applied position.

The invention possesses other objects and features of advantage, some of which, with the foregoing, will be made manifest in the following description of the preferred form of the invention which is illustrated in the drawings accompanying and forming part of the specification. It is to be understood that it is not intended to limit the invention to the embodiment shown by the said drawings and description as variations may be adopted within the scope of the invention as set forth in the claims.

Referring to the drawings:

Figure 1 is a side elevation of an automobile wheel showing the device applied.

Fig. 2 is a perspective of the device.

Fig. 3 is a side elevation, and

Fig. 4 is a top end plan view with a portion of the lock shell or casing being broken away to indicate the locking means.

A highly effective and practicable means for preventing the theft of automobiles consists of a band-like structure of movably connected side arms that are adapted to be encompassed about a portion of the felly and rim of an automobile wheel W and then locked in place, the function of the device being to indicate the unwarranted movement of the vehicle so long as the device is applied to one of the wheels. As the devices of this character are usually applied while the tire is inflated it has been found possible to rotate the device around the tire and felly so as to bring it to an ineffective position as by the removal of a sharpened or ground engaging portion from the tread of the tire. In some cases these devices are provided with noise making means that are set in action or released for action when the toe of the device is moved into contact with the road-way and if the device be rotated about the tire a tripping or effective noise making position will therefore be so changed as to render the device inoperative in its noise making function and the present invention concerns provisions operative to prevent the rotation of the device around the tire and felly when the tire is deflated and also to prevent the warping or oblique or diagonal setting of the device so as to render it ineffective.

The preferred embodiment of the invention consists of a device of band-like structure having side arms 2 and 3 curved to embrace the sides of the tire and felly of a wheel W the arms converging at the outer or ground engaging end into a body portion 4 to rest over the tread of the tire; the arm 3 in the present case being pivoted at 5 to swing outwardly in the plane of the band to an open position.

What might be called the inner ends of the arms 2—3 converge toward each other at the angles 6—6 and have short parallel extensions 7—7 to be brought in close juxta-position to the felly F of the wheel on which is mounted the tire T. The remote ends of the extensions 7—7 of the arms are provided with inwardly directed shoulders 8—8 each provided with plane meeting faces 9 which lie in a plane parallel to the axis of the pivot 5 of the swinging arm 3.

The shoulder or body part 8 of the arm 2 is provided with a keeper socket 10 to receive a locking tongue 11 provided on the opposite shoulder part 8 of the arm 3. The tongue 11 is perforated to receive a bolt 13 slidably mounted in the part 8 of the arm 2 and movable by a key K to a releasing position with respect to the tongue 10.

To prevent the prying open of the locked elements the shoulders 8—8 are provided with an offset portion 15 in their meeting faces thus preventing the forcing of a tool down between the meeting faces sufficiently to separate the parts.

This device is adapted to be applied to the felly and tire at a position between the spokes S of the wheel with the toe portion 4 extending outwardly over the tread of the tire and the separable elements closed about the felly and locked by the projection of the tongue 11 into the keeper 10; the bolt 13 preferably being of the automatic or spring actuated type.

For the purpose of preventing the rotation of the band-like device about the tire T if the latter be deflated means are provided on the inner ends of the arms 2—3, said means being automatically brought into juxtaposition with adjacent spokes S in the application of the device to the wheel so that it is not necessary to arrange the device in any particular or definite relation with respect to a spoke or to any particular position between the spokes since the spoke engaging means are designed to become effective by the mere application of the device to a position between the spokes. Such means preferably comprises guard prongs one of which is indicated at 16 and project- ing laterally from the upper portion of the arm 2 in a position substantially perpendicular to the medial plane of the band-like device while the upper end of the arm 3 is provided with a similar guard prong 17 but which is arranged diagonally opposite to the prong 16 so that one of the prongs overlaps the outer face of one spoke of a pair between which the device is arranged while the other guard prong extends across the inner or back face of another spoke. These guard prongs 16 and 17 are of such length as to engage one or the other of the spokes between which the device is placed according to the direction in which the device may be rotated about the tire.

If the theft signal be of the type including a noise producing mechanism such for instance as will be operable by a plunger 18 projecting from the toe 4 it is desirable to prevent a warping of the device to such a position as to render the plunger inoperative by moving it out of position in which it would contact with the roadway. Since the prongs 16 and 17 are diagonally opposite each other on opposite sides of the device the latter could possibly be shifted to an oblique or diagonal position with respect to the tire and then turned slightly to withdraw the plunger point 18 from effective position but this is prevented by the provision of shorter diagonally opposite lugs 19 and 20 of which, therefore, there is one adjacent each of the prongs 16 and 17. As clearly shown in Fig. 4 the short lugs 19 and 20 will move into juxtaposition with and against the adjacent spokes S if the device be twisted or warped to an oblique or diagonal position at which time the longer lugs 16 and 17 would move away from the respective spokes.

The plunger 18 is in the present case operative upon a suitable mechanism not shown or described in the present case but which may be arranged in the box or casing 21 provided on or in the arm 2 which has an inner side wall 2' perforated for the emission of sounds from the alarm mechanism within the box 21.

For the purpose of protecting the surface finish of the spokes S of the wheel the several lugs 16, 17, 19 and 20 may be provided with pads of any suitable material for instance as inlays of rubber as shown at 23.

What is claimed is:

1. A theft-warning automobile lock comprising a band-like device having arms adjustable about the felly and tire of a wheel and abutting between the spokes thereof, means on the abutting parts for locking the device applied, and means engageable with each adjacent spoke for preventing the warping of the device to an ineffective position.

2. A theft-warning automobile lock comprising a band-like device having arms adjustable between the spokes and about the felly and rim, of a wheel, the arms of the device abutting between the spokes and having projecting means at their ends to overlap two adjacent spokes of the wheel and prevent rotation of the device about its longitudinal axis.

3. A theft-warning automobile lock comprising a band-like device adjustable between the spokes and about the felly and rim, of a wheel, the portion of the device between the spokes having diagonally opposite prongs to overlap spokes of the wheel and prevent warping and rotation of the device in such manner as to turn it to an ineffective position on the tire.

4. A theft-warning automobile lock comprising a band-like device having arms applicable to a portion of the felly and tire and abutting between the spokes of a wheel, and means on the felly-embracing arms of the device and projecting from said arms substantially perpendicularly to the medial plane of the device to overlap adjacent spokes and prevent movement of the device about the tire and rim in such manner as to render the device ineffective.

5. A theft-warning automobile lock comprising a band-like device applicable to a portion of the felly and tire and having arms with abutting heads between the spokes of a wheel, and means on the heads of the device and projecting substantially perpendicularly to the medial plane of the device to overlap diagonally opposite sides of adjacent spokes so that the device cannot be turned to inoperative position on the tire.

6. A theft-warning automobile lock comprising a band-like structure adjustable about the tire and felly of a wheel, and between the spokes thereof, means for locking the structure so adjusted, and means engageable with either of adjacent spokes when the device is shifted so as to prevent the rotation of the structure out of effective position.

7. A theft-warning automobile lock comprising a band-like device with side arms adjustable about the felly and tire and abutting between spokes of a wheel, means for locking the device applied, and means on the abutting end of each arm for engaging one each of two adjacent spokes to prevent rotation of the device to an ineffective position.

8. A theft warning automobile lock comprising a pair of side arms lockable around the tire and felly and meeting between spokes of a wheel, and diagonally opposite guard lugs extending from the sides of the arms toward and adapted to abut either of two adjacent spokes according to the direction of rotation of the applied device around the tire and felly, thus maintaining the device in operative position.

9. A theft-warning automobile lock comprising a pair of side arms lockable around the tire and felly between spokes of a wheel, and guard lugs extending from opposite sides of each arm toward, and adapted to abut, the adjacent spoke upon rotation of the applied device around the tire and felly.

10. A theft-warning automobile lock comprising a pair of side arms lockable around the tire and felly between spokes of a wheel, and guard lugs extending from opposite sides of each arm toward, and adapted to abut the adjacent spoke upon rotation of the applied device around the tire and felly, the lugs of each arm being of different length so that the longer lug becomes effective when a short lug clears the adjacent spoke.

11. A theft-warning automobile lock comprising a pair of side arms lockable around the tire and felly between spokes of a wheel, and guard lugs extending from opposite sides of each arm toward, and adapted to abut the adjacent spoke upon rotation of the applied device around the tire and felly, the lugs of each arm being of different length, and the lugs of equal length arranged in diagonal relation, the longer lugs maintaining contact with the spokes when the short lugs clear the same.

In testimony whereof, I have hereunto set my hand.

JOHN K. McDONALD.